May 12, 1959 H. HURVITZ 2,886,777
AMPLITUDE DISPLAYS
Filed April 27, 1955
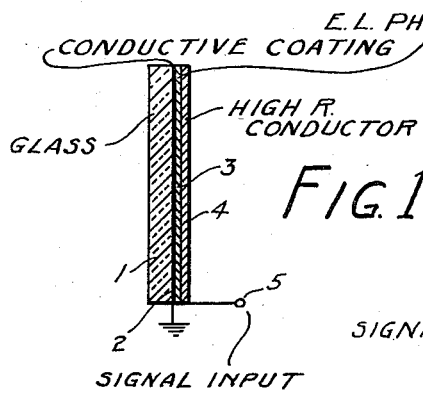
Fig. 1
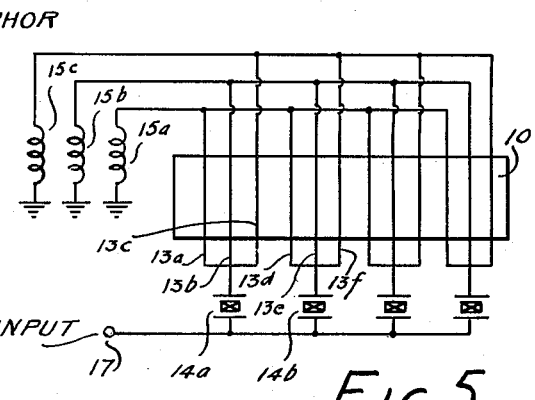
Fig. 5
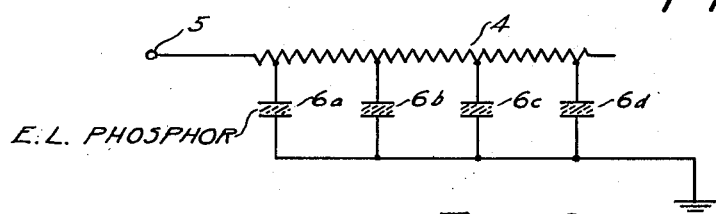
Fig. 2
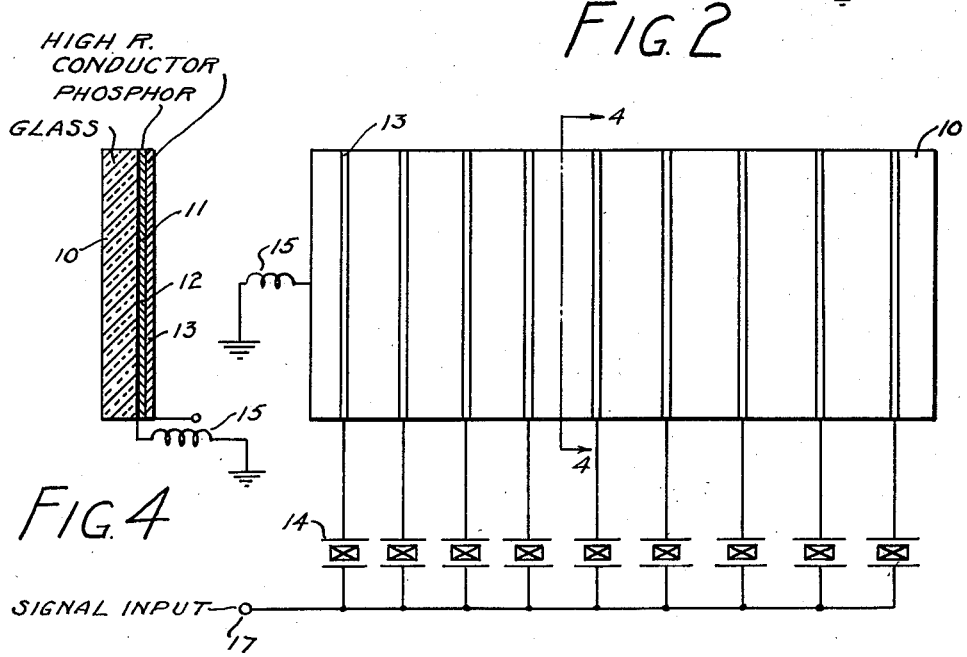
Fig. 4
Fig. 3
INVENTOR
Hyman Hurvitz

United States Patent Office 2,886,777
Patented May 12, 1959

2,886,777

AMPLITUDE DISPLAYS

Hyman Hurvitz, Washington, D.C.

Application April 27, 1955, Serial No. 504,261

12 Claims. (Cl. 324—78)

The present invention relates generally to amplitude displays and more particularly to systems for displaying the amplitude of an alternating voltage, and to displays of frequency spectra, wherein the displays include both frequency and amplitude information relative to each frequency in a band of frequencies.

Briefly describing the present invention, in one of its aspects, a pair of elongated thin conductors are separated by an electroluminescent phosphor incorporated in a dielectric medium. The two conductors accordingly form a transmission line. The conductors themselves are selected of high resistance material so that the transmission line consists effectively of high resistance series elements and capacitive shunt elements. It is known that transmission lines of this type provide voltage attenuation in the direction of their lengths when voltage is applied at one end of the transmission line, the attenuation being proportional to the product of resistance per unit length of the conductors and the capacity per unit length between the conductors, and to the frequency in radians per second. Accordingly, by properly selecting the capacity per unit length and the resistance per unit length, for any operating frequency, a predetermined attenuation may be caused to occur along the transmission line, and hence a given value of voltage at each point along the transmission line, for any given value of input voltage.

Electroluminescent phosphors are known to possess the property that in the absence of some minimum voltage, at any specified frequency, no consistent and readily visible glow occurs. For values of voltage above this minimum a glow occurs which increases as an exponential function of applied voltage, and also as a function of frequency, there being, however, saturation points for both voltage and frequency, beyond which an increase in either frequency or voltage or both results in no increase in luminous output.

Accordingly, when adequate voltage is applied to a transmission line of the type above described a glow occurs between the conductors which extends along the length of the conductors for a distance determined by the amplitude of the input voltage, and by the attenuation law established for the particular pair of conductors. It follows that any given pair of conductors may be calibrated, and may operate as a voltage amplitude indicator.

Reference is here made to U.S. patent to E. L. Mager, No. 2,624,857, for further detailed information concerning field sensitive luminous elements which are essentially electroluminescent condensers.

It has been indicated in my prior application, Serial No. 477,892, filed December 27, 1954, how the phenomena of electroluminescence may be utilized to generate a visual display of the frequencies contained in a given frequency band. The amplitude of the signal at each frequency is indicated, however, in that application in terms of intensity of luminescence. The present application is a continuation-in-part of my application, Serial No. 477,892, filed December 27, 1954, and of my application, Serial No. 495,705, filed March 21, 1955, now U.S. Patent No. 2,796,584 and is directed to the problem of improving the systems of those applications by providing a frequency spectrum display, in which the amplitude of a signal at each frequency is displayed in terms of the length of a luminous line.

It is accordingly a primary object of the present invention to provide a novel luminous display.

It is another object of the present invention to provide a novel frequency sensitive indicator of signal amplitude.

Still another object of the present invention resides in the provision of a spectrum analyzer, in which a plurality of voltage amplitude indicators is provided, each being in series with a piezo-electric crystal resonant to a selected frequency.

Still another object of the present invention resides in the provision of a system for indicating the frequency and amplitude of a plurality of signals existing in a predetermined frequency band, a single piezo-electric crystal being utilized in conjunction with tuning elements, to separate a plurality of frequencies, in accordance with harmonic responses of the crystal, and the several harmonic responses of the single crystal being indicated in terms of their amplitudes by means of electrosensitive highly attenuating transmission line indicators.

The above and still further features, objects, and advantages of the present invention will become apparent upon consideration of the following detailed disclosure of various specific embodiments thereof, especially when taken in conjunction with the accompanying drawings, wherein:

Figure 1 is a view in transverse cross section of a luminous voltage amplitude indicator, in accordance with the invention;

Figure 2 is a schematic representation of a highly attenuating RC transmission line;

Figure 3 is a view partly in schematic circuit diagram of a spectrum analyzer which provides a visual display of the frequency content of a frequency band, and of the amplitude of each signal in the band;

Figure 4 is a view taken on the line 4—4 of Figure 3; and

Figure 5 is a view partly in schematic form of a spectrum analyzer which broadly follows the teachings of Figures 3 and 4, but in which the total number of crystals utilized to display a given number of frequencies has been radically reduced, by utilizing harmonic responses of the crystals.

Referring now more specifically to Figure 1 of the accompanynig drawings, the reference numeral 1 indicates a transparent plate 1, which may be fabricated of glass or the like. A conductive transparent coating 2 is applied to one surface of the plate 1, and over the transparent coating is applied a coating of electroluminescent phosphor, of the type disclosed in my prior applications above referred to, or otherwise known to those skilled in the art. Superposed on the layer of phosphor 3 is an elongated thin conductor 4, which is selected to have high resistance per unit length.

For convenience, the conductive element 2 is shown to be ground and the terminal 5 is shown as connected to one end of the elongated conductive member 4.

It will be apparent that in one sense the conductors 2 and 4 separated by the luminous phosphor 3 embedded in a dielectric material constitute a condenser, and that in another view these elements constitute a transmission line. Were the conductor 4 selected to be of low resistance, the element would be essentially a conductor, and at sufficiently low frequently would have no transmission line attributes. By selecting the conductor 4 to be of extremely high resistance, the device becomes in many respects a transmission line, despite the fact it is operated at frequencies such that the length of the transmission line is extremely short relative to the wave length of the applied signal. This is so because the high resistance of the element 4 introduces, in conjunction with the capacity existent between any given length of the conductor 4 and the underlying conductor 2, a high attenuation per unit length. This attenuation may be selected to be of the order of 3 db per inch, that value being sunggested for the sake of example only, and the total length of the conductor 4 may be 6 to 8 inches, if desired, or may be several feet long, provided especially that the conductor 4 traverses a reentrant path, rather than a rectilinear path.

In particular, the conductor 4 may be constituted of high resistance printed circuitry, or in the alternative of high reistance wire cemented to the phosphor layer.

Reference is now made to Figure 2 of the accompanying drawings showing schematically a circuit equivalent in electrical properties to the transmission line or condenser of Figure 1. Here the input terminal is designated by the reference numeral 5. The conductive element 4 is shown as a resistance. The electroluminescent phosphor 3 which extends continuously between the conductors 4 and 2 of Figure 1 are now shown as discrete electroluminescent condensers 6a, 6b, 6c, 6d. It will be obvious that as signal travels from the terminal 5 to the right in the resistance 4 current is leaked to ground through the condensers 6a, 6b, 6c, 6d, resulting in incremental voltage drops along the length of the resistance 4. Considered as a filter, the attenuation in passing through any section of the circuit of Figure 2, is proportional to the product of the resistance passed through and the shunt capacity, as well as of the frequency applied, since the latter determines the reactance of the condenser. For any given frequency the attenuation per unit length of circuit may be increased by increasing the resistance of the resistance 4, and/or by increasing the capacity of each of condensers 6a, 6b, 6c, 6d.

Referring now more particularly to Figure 3 of the accompanying drawings, the reference numeral 10 denotes a transparent plate, which may be fabricated of glass or other transparent material, or of a plastic material which possesses low losses of frequencies at several mc. per second, the plate 10 being coated with a transparent layer 11 of electrically conducting material, the specific character of which and the mode of applying which is fully described in the Mager patent, above referred to. A mass of electroluminous phosphor embedded in an insulating medium is coated on the layer 11, and a plurality of stripes 13, of high resistance conductive material is then applied over the phosphor layer 12 as by printed circuit techniques or any other convenient fashion. Accordingly, each one of the conductors 13 corresponds to the system of Figure 1, and the plate 10 with its accompanying luminous layer, and discrete elongated conductors 13, constitutes a multiple indicator for indicating the amplitudes of voltages. These voltages may be at any frequency from several cycles per second to 50 mc. per second, provided the resistance per unit length and the capacitance per unit length of the conductors 13 with relation to the underlying plate 10 have been properly selected to give the required attenuation per unit length for the conductor 13 at the frequency specified.

Each one of the conductors 13 is connected in series with a piezo-electric crystal, as 14, the separate piezo-electric crystals being resonant to slightly different frequencies, in ascending order as one proceeds to the right in Figure 3 of the drawings, and the Q or quality factor of the crystals being so selected that some overlap of selectivities of the crystals occurs. The aggregate set of crystals encompasses a predetermined relatively extensive band of frequencies. Connected in series between the conductive layer 11 and ground is an inductance 15, which is of relatively low Q, and which tunes the separate condensers formed on the plate 10 over the frequency band encompassed by the array of crystals 14. A common signal input terminal 17 is provided for all the crystals 14, so that the terminal 17 is in series simultaneously with each of the crystals 14 and with one end of each of the conductors 13, the signal paths to ground all proceeding via the tuning coil 15. It follows that upon application to the terminal 17 of any signal within the assigned frequency band, all the crystals 14 except one will present a high impedance, or an open circuit, to the signal. That one of the crystals 14 which is resonant to the frequency of the signal, presents a closed circuit, essentially, and permits current to flow to the associated conductor 14. Accordingly, a glow is produced in the phosphor existing between the conductor 13 and the underlying conductive layer 11, the glow extending along the length of the conductor 13 in accordance with the amplitude of the desired signal. If desired, the crossover points of the selectivity curves of adjacent crystals may occur at point 3 db down on the selectivity curves.

It follows then that the response indication of the amplitude corresponds not only to the amplitude of the signal as it appears at the terminal 17, but also depends upon the point on the selectivity curve at which the response is measured. Whenever a frequency occurs midway between the resonant frequencies of two crystals, both crystals will respond equally and accordingly two visual responses will occur, each of which will be half of that which would have occurred had the applied frequency been precisely resonant to a selected crystal. To this extent the response may be considered inaccurate. However, most signals occurring in practice contain energy over a sufficiently wide band that the response of the system is accurate, because some of the energy of the system occurs at the maximum response points of one or more of the crystals. For example, with the present system utilized to display the frequency of recurrent pulses, such as occur in radar systems, obviously each train of pulses possesses a frequency band, rather than a single frequency. Accordingly, the present system may be utilized to determine the maximum amplitude of the pulse train, and to obtain an indication of the band of frequencies within which pulse energy occurs.

The system of Figure 3 of the drawings requires the use of one piezo-electric crystal 14 for each frequency which is to be indicated. For systems in which a limited number of frequencies is to be indicated the number of crystals required is not unduly great. For other systems, wherein extreme resolution is required over a considerable band of frequencies, the number of crystals does become unduly great. The problem of reducing the number of crystals required for a given number of displays is solved in accordance with the embodiment of my invention illustrated in Figure 5 of the accompanying drawings, by utilizing the fact that piezo-electric crystals respond not only at the fundamental frequencies of the crystals, but also at harmonic frequencies, and more particularly at odd harmonics. It is known that the Q or quality factor of a piezo-electric crystal is the same at the fundamental frequency as at the harmonic frequency. However, the selectivity curve of the crystal widens in proportion to the order of harmonic involved, other things being equal. This fact may or may not be undesirable for any specific application.

In the system of Figure 5 a plate 10 is utilized, corresponding with the plate 10 of Figures 3 and 4 of the drawings. Conductors are utilized, overlying a layer of electroluminescent phosphor, but the conductors are arranged in groups. For the purposes of the present exposition each group is assumed to consist of three conductors, the first group consisting of conductors 13a, 13b, 13c; the second group of conductors 13d, 13e, 13f, etc. A first piezo-electric crystal 14a is connected in series with the several conductors 13a, 13b, 13c, taken in parallel. A second crystal 14b is connected in series with conductors 13d, 13e, 13f, all taken in parallel. Accordingly, whenever a signal at the fundamental frequency of the crystal 14a, or at any harmonic of that fundamental frequency, is applied to the input terminal 17, all the conductors 13a, 13b, 13c are supplied with signal. Similarly, the signal 14b which is offset slightly in resonant frequency from the resonant frequency of the crystal 14a, emergizes the conductors 13d, 13e, 13f, whenever a signal arrives which corresponds in frequency with the resonant frequency of the crystal 14b, or any harmonic thereof. The conductors 13a, 13d are jointly connected in series with a tuning coil 15a, which resonates these conductors to the fundamental frequency of the crystals 14a, 14b, this being possible because the coil 15a has a relatively low Q. When a signal is applied to the conductors 13a, 13b, 13c, by virtue of the harmonic response of the crystal 14a, provided the harmonic is the third harmonic, the conductor 13b is resonated by means of the coil 15b. It follows that the voltage existent between the conductor 13b and the underlying conductor 11 is then high, whereas the voltage existing between either of the conductors 13a and 13c and the underlying conductor 11 is relatively low. Accordingly, the glow appears under the conductor 13b. In the event the fifth harmonic response occurs, the conductor 13c is resonant by virtue of the series connection of the coil 15c therewith, and in such case a glow appears under the conductor 13c, but not under the remaining conductors 13a, 13b.

It will be apparent then that a double selection of frequencies occurs. The crystal 14a applies signals to a plurality of conductors simultaneously. These conductors, however, are each connected in series with different coils, which tune the separate conductors to different harmonic frequencies for which response might be expected from the piezo-electroc crystal 14a. The Q factors of the separate coils 15a, 15b, 15c may be of the order of about 30. In such case for a signal of a given amplitude the response of that one of the conductors 13a, 13b, 13c which is resonated is thirty times greater than are the responses of the remaining excited conductors, which are not resonated. It follows that unless the input amplitude is extremely great, only that one of the conductors 13a, 13b, 13c, will be excited sufficiently to produce a luminous indication which is not only in series with a piezo-electric crystal excited at one of its response frequencies, but which is simultaneously in series with a suitable resonating coil.

While I have described and illustrated various specific embodiments of my invention, it will become apparent to those skilled in the art that variations of structure and of arrangement may be resorted to without departing from the true spirit and scope of the invention.

While I have described my invention as applied broadly to the measurement of frequency and the indication of the amplitudes of signals at each of these frequencies, it will be apparent that the signals themselves will be representative of quantities, in respect to either their amplitudes or their frequencies or both, and accordingly the present system may find utility in the art of telemetering or of effecting remote measurements. In addition, the received frequencies may be deliberately selected at a transmitter, in accordance with desired information, in which case the present indicator may form a novel and important element of an information or data transmission system.

Values of attenuation per unit length of transmission line, of the order of one db per cm. prove valuable in the practice of my invention, and values of resistance per cm. of the order of 10 ohms.

What I claim is:

1. In combination, a pair of elongated conductors, a layer of electrosensitive material interposed between said conductors, at least one of said conductors having a resistance of at least 10 ohms per centimeter, said conductors having input terminals, a source of a relatively wide frequency spectrum, and means connected between said source of a relatively wide frequency spectrum and said input terminals for transferring to said input terminals only a relatively small fraction of the frequencies of said relatively wide frequency spectrum.

2. In combination, a pair of elongated conductors, a layer of dielectric electrosensitive material interposed between said conductors, whereby to form an elongated electrosensitive condenser of capacity C per unit length, at least one of said conductors having a resistance R per unit length, said capacity C and resistance R having a product selected to produce an attenuation of $a$ decibels per unit length of said conductors, at a frequency $w$ radians per second, where $a$ is at least 3 decibels per meter, said elongated condenser having input terminals, a source of a relatively wide frequency spectrum of frequencies, means for coupling only a relatively small portion of said relatively wide frequency spectrum from said source and said input terminals, and a tuning inductance connected to one of said input terminals, arranged for effecting a resonant rise of frequency across said input terminals.

3. A frequency and amplitude display board, for displaying the frequencies and amplitudes of a plurality of alternating voltages, comprising a support, a layer of electrosensitive material on said support, a plurality of elongated conductor pairs each sandwiching said material, whereby each of said elongated conductor pairs constitutes an elongated condenser, means for resonating with each of said elongated condensers at least approximately over a frequency band, means adapted for applying voltages of different discrete frequencies to separate ones of said condensers, the resistances of said separate conductor pairs and the capacities of the condensers constituted by the separate conductor pairs having a product selected to produce a relatively high attenuation per unit length of conductors said attenuation being at least three decibels per meter.

4. In combination, a plate of transparent material, said plate having good electrical conductivity, a layer of electrosensitive material supported by said plate, a plurality of relatively high resistance thin elongated conductors, extending over and in contact with said material, a plurality of piezo-electric crystals, means connecting each of said piezo-electric crystals to a different set of said conductors, each set including $w$ conductors, where $w$ equals 1, 2, 3 . . . each of said piezo-electric crystals series resonant to a different frequency within a frequency band, a tuning coil in series with each of said conductors, the resistance per unit length of each of said conductors and the capacity per unit length of each of said conductors taken to said plate being selected to provide attenuation of at least 3 db per foot over said band.

5. In combination, a pair of relatively thin elongated conductors, electrosensitive material interposed between said conductors, means for applying a signal at frequency $f$ across said conductors, said conductors constituting an elongated condenser, means for resonating with said elongated condenser at least approximately at said frequency $f$, the capacity and resistance of said condenser per unit length being so selected that attenuation to voltage of frequency $f$ exists along the length of said condenser of at least 10 db per foot of length over said frequency band.

6. A pair of elongated conductors, a layer of electrosensitive material interposed between said conductors, the electrical capacity per unit length and the resistance per unit length of said elongated conductors with said interposed layer of material including said material being selected to provide a range of different values of voltage gradient between said layers at different points along the length thereof in response to A.C. voltage applied to said conductors at one end thereof said range of values including at least one value for which said electroluminescent material fires and at least one value for which said electroluminescent material fails to fire, and means for resonantly increasing the voltage between said conductors.

7. A pair of elongated conductors, a layer of electrosensitive material interposed between said conductors, at least one of said conductors having a resistance of at least 10 ohms per centimeter of length, a source of A.C. voltage, means for applying said A.C. voltage to said conductors at one end thereof, and inductive means for resonantly increasing the A.C. voltage at said one end thereof, said inductive means being connected to said one end thereof.

8. In combination, a two conductor transmission line having relatively high attenuation per unit length, and a voltage sensitive dielectric material between said conductors said attenuation being at least 3 db per meter, wherein one of said conductors is a ground plate having relatively great extension transversely of said transmission line, the other of said conductors having relatively small extension transversely of said transmission line.

9. A transmission line comprising a plurality of series connected relatively high resistances, a plurality of voltage responsive capacitive visual indicators respectively connected each from a different junction of two of said resistances to a point of reference potential, the combination of the resistances and the capacities of the visual indicators being selected to provide an attenuation constant of at least 3 db per meter along said transmission line.

10. In combination, a plurality of transmission lines, each of said transmission lines having separated conductors and electroluminescent material interposed between said conductors, a plurality of band-pass filters tuned each to a different frequency of a band of frequencies, said different frequencies being adjacent, and means for connecting said filters to said transmission lines in one-to-one relation, each of said transmission lines arranged to have an attenuation of at least 2 db per inch of length for frequencies within said band of frequencies.

11. In combination, a transmission line comprising two separated conductors and electroluminescent material interposed between said conductors, a band-pass filter connected in series with said transmission line, said transmission line arranged to have attenuation of at least 2 db per inch of length of the pass frequency of said filter.

12. A pair of elongated conductors, a layer of electrosensitive material interposed between said conductors, at least one of said conductors having a resistance of at least 10 ohms per centimeter of length, and a source of relatively wide band signal connected to said conductors at one end thereof, wherein is provided a filter in series between said source of signal and said conductors, said filter having a relatively small band pass.

References Cited in the file of this patent

UNITED STATES PATENTS

| | | |
|---|---|---|
| 1,814,399 | Meissner et al. | July 14, 1931 |
| 2,087,652 | Oakley | July 20, 1937 |
| 2,243,702 | Hansell | May 27, 1941 |
| 2,624,857 | Mager | Jan. 6, 1953 |
| 2,684,450 | Mager | July 20, 1954 |
| 2,698,915 | Piper | Jan. 4, 1955 |